US006940957B2

(12) United States Patent
Elberbaum

(10) Patent No.: US 6,940,957 B2
(45) Date of Patent: *Sep. 6, 2005

(54) METHOD AND APPARATUS FOR CONNECTING A TELEVISION INTERPHONE MONITOR SYSTEM TO A CONCIERGE STATION OVER THE INTERNET

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/621,926

(22) Filed: Jul. 17, 2003

(65) Prior Publication Data

US 2004/0022377 A1 Feb. 5, 2004

Related U.S. Application Data

(63) Continuation of application No. 09/912,002, filed on Jul. 24, 2001, now Pat. No. 6,603,842.

(51) Int. Cl.[7] .............................................. H04M 11/00
(52) U.S. Cl. ............................. 379/106.01; 379/90.01; 348/14.01; 348/143

(58) Field of Search ................................. 348/143, 152, 348/156, 153, 14.01, 14.02, 14.08, 14.11; 379/102.06, 90.01, 93.01, 93.05–93.08, 93.14–93.17, 93.24, 93.25, 167.01, 167.02, 167.11

(56) References Cited

U.S. PATENT DOCUMENTS

| 5,754,637 A | 5/1998 | Choi |
| 5,923,363 A | 7/1999 | Elberbaum |
| 6,072,861 A | 6/2000 | Yu |
| 6,603,842 B2 * | 8/2003 | Elberbaum ............. 379/106.01 |

* cited by examiner

Primary Examiner—Wing Chan
(74) Attorney, Agent, or Firm—Katten Muchin Rosenman LLP

(57) ABSTRACT

A method and apparatus for connecting a television interphone monitor system including at least one television interphone monitor connected via internal communication lines and a matrix selector with at least one entrance panel, and with at least one interface unit to an E concierge station via a communication network selected from the group consisting of dedicated network, public network and the Internet.

40 Claims, 10 Drawing Sheets

METHOD AND APPARATUS FOR CONNECTING A TELEVISION INTERPHONE MONITOR SYSTEM TO A CONCIERGE STATION OVER THE INTERNET

This is a continuation of U.S. application Ser. No. 09/912,002 filed Jul. 24, 2001 now U.S. Pat. No. 6,603,842.

BACKGROUND OF THE INVENTION

1. Field of the Invention

This invention relates to a television interphone apparatus provided for communication between building entrances and individual apartments of the building, along with transmission of visitor's pictures to a monitor mounted on the wall of the apartment, or to a concierge counter and/or to a concierge/service center over the internet.

2. Description of the Prior Art

A television interphone monitor used for entrance monitoring and communications is mounted on a wall inside the apartment and is wired via multi-core cables for connecting to each other different elements of the system, such as a microphone and speaker wires, a coax cable for video signals, a door release wire, a calling wire and an alarm wire. Whenever a more complex system is installed such as for multi-entrances and/or concierge station systems the wiring becomes very complex and costly.

Moreover, when a complex multi-entrance system is installed and operated by several visitors from different entrances all of the visitors, except a visitor that is connected to his selected apartment, must wait until the "busy" communication line is cleared first, at which time the system connects the next visitor in line. This busy line state causes delays and other inconveniences, particularly whenever a concierge is engaged in lengthy communication with a tenant and/or a visitor through the video interphone system network.

Furthermore, some buildings employ several concierge stations, while in other buildings the concierge services are offered partially, such as only during daytime. This causes confusion and further delays as tenants keep on calling the concierge, rendering the communication line busy and loading the video interphone system constantly, denying emergencies and other needed concierge services.

Another type of television interphone monitoring system is disclosed in U.S. Pat. No. 5,923,363, wherein the entrance unit comprises a matrix switching apparatus for connecting a plurality of entrance units and concierge units to multiple apartments simultaneously.

However, in the event that a concierge services are not available around the clock, or when a single concierge serving the whole building is fully occupied and busy, the need for emergency or any other services may not be timely attended, thereby rendering the services poor and inefficient.

SUMMARY OF THE INVENTION

An object of the present invention to is provide a method and apparatus for connecting a television interphone monitoring system via wired or wireless, dedicated or public telephone or other networks and/or via the internet to an E concierge station, providing the tenants and visitors alike with non limited concierge services around the clock. Another object of the present invention is to provide for a simple recall of the E concierge station via a simple key touch, and to further simplify the communication with the operators of the E concierge station by providing two way voice and picture or data communications, thereby allowing small children and the elderly that are unable to operate a PC or other internet interfacing device, a simple, fast and efficient recall of the E concierge station and request a variety of services by communicating through the handset and the monitor of the television interphone monitor and/or through the entrance panel, using the voice, picture and data communicating facilities of the television interphone monitoring system.

An apparatus for connecting a television interphone monitoring system via a public telephone line to an E concierge station according to the present invention comprises a single entrance panel or a plurality of entrance panels each comprising a microphone and a speaker, and each of which may comprise a television camera and a display monitor and each of the entrance panel processing an electrical information signal including two-way audio signals and/or one or two-way video signals and/or data signal, a single television interphone monitor or a plurality of television interphone monitors for communication with and observing the visitors, a single transmission line or a plurality of transmission lines for connecting each television interphone monitor with a central unit or directly with the single entrance panel or the plurality of entrance panels.

The central unit may include a circuit for feeding an information signal to a television interphone monitor and a circuit for receiving the information signal from the television interphone monitors through corresponding transmission lines. The central unit and the television interphone monitors may be connected through matrix switching circuits for connecting any one of the entrance panels to any one of the television interphone monitors or switching over from one entrance panel to another or from one television interphone monitor to another.

The central unit may incorporate a signal separation/injection circuit to inject video signals generated by the television camera along with audio, data, control and alarm signals for propagating combined information signals through the transmission lines to the television interphone monitor or to a concierge station or to the E concierge station via dedicated or public telephone lines or via wireless telephone or other communication network or via the internet. As the signals are mutually injected into the transmission line they become a combined information signal, propagated between the entrance panels and the television interphone monitors or between the entrance panel and a concierge station or the E concierge station. A signal separation/injection circuit can be installed in the switching circuits of the central unit to inject or separate from the transmission line the information signals processed by the switching circuit, or multiple separation/injection circuits can be incorporated one per each transmission line.

The separation/injection circuit also separates the information signal propagated through the transmission line from any DC components present on the transmission line whenever the television monitor interphone is powered via the transmission line, and feeds the separated information signal to the receiving circuit of the entrance unit. The receiving circuit may comprise decoding/demodulating circuits for feeding the video, audio, data, control and alarm signals to the respective circuits.

Each television interphone monitor may further incorporate a signal combining circuit to process and combine video, audio, data, control and alarm signals generated by the television interphone monitor, and an injection circuit to inject the combined signals that form an information signal into the transmission line connecting the television interphone monitor with the central unit or the entrance unit or the concierge station or the E concierge station.

The interphone television monitor of the present invention may further comprise a television camera for generating video signals, a control circuit for generating and feeding a control signal consisting of a coded control command such as a code for controlling the entrance door lock and/or a code for controlling the elevators, or a code for controlling the lighting of corridors and the entrance. The coded control command may include alarm signals for alerting a concierge or a security attendant. The coded control command may also include a switch-on control command for connecting the television interphone monitor with any of the entrance panels or switching over from one entrance panel to another or for connecting the television interphone monitor with a concierge station or with a security room or with the E concierge station.

The coded control signals may use a binary code or digital codes consisting of high-low or narrow-wide pulses or use dual tone signals used for a digital telephone, or use a specific frequency or a pulse count, or a mixture of different pulses and frequencies for a given control command. The coded control can be AM or FM and combined into the audio frequency range and mixed with the audio and/or video signals propagated between the television interphone monitor and the entrance unit.

Similar or identical coded control signals are also generated by the central unit or the entrance panel for controlling individual functions related to each television interphone monitor, such as ringing, switching the monitor on, a fire alarm annunciation, a general alarm annunciation, switching the lighting of corridors on-off, or blocking the elevators and/or many other coded controls for operating functions of a concierge and/or alarm attendant for an apartments' building or a block.

The video signals generated by the television camera may be converted into differential signals for propagation via low cost transmission lines such as a twisted pair and may be processed into digital video signals, or modulated onto a carrier frequency.

The video and audio signals along with the control and alarm signals generated by the entrance panel or the central unit and the television interphone monitor may also be converted into differential signals or digital signals and may be AM or FM modulated onto a carrier frequency having a frequency higher or lower than the video frequency and propagated through the transmission line connecting the television interphone monitor with the central unit and/or with the entrance unit. The video signals may be compressed signals and the audio signals along with the control and alarm signals may also be compressed and mixed into the video signals preferably during the vertical blanking period.

The entrance unit, or the central unit or the television interphone monitor unit may further comprise or be connected to an internet interface unit which converts the video, audio, data, control and alarm signals to digital signals for propagating the digital signals through wired or wireless, dedicated or public, digital or analog telephone or other communication network for connecting the video interphone system to the E concierge station. The internet interface unit may be a well known PC with modem and provided with software for video, audio and data communication via the internet or it can be a well known micro processor based interface with limited applications, specifically designed for communication with a given internet station.

In large installations of large condominiums requiring more than one internet access line, several interfaces and several wired or wireless lines can be installed, or the internet interface can be such that will connect a plurality of television interphone monitors and/or entrance panels, using wideband wired or wireless public or dedicated lines, for communicating between the E concierge station and multiple apartments and/or entrances simultaneously.

The well known PC or the micro processor based interface may also be provided with video, audio and data recording facilities, for recording all visitors along with the time and date of their visit as well as recording all events and for storing and safe keeping the recorded data for long periods. The video recorder, digital or analog and/or audio recorder can be separately connected to an entrance unit or to the central unit for recording all visitors and events, while a recorded data can be replayed onto a television interphone monitor, or onto a concierge station or onto a guard station via playback command by a tenant, a security guard, a concierge or the E concierge station.

According to the preferred embodiment of the present invention the video signals and the audio signals along with data, alarm and control signals can be bi-directionally propagated through a low cost transmission line extending between the central unit and the television interphone monitor, and via telephone lines or other public or dedicated communications networks between the central unit and E concierge station, while a regulated current as disclosed in U.S. Pat. No. 5,923,363, may be fed to the television interphone monitors through same low cost transmission line connecting the central unit and the television interphone monitors.

BRIEF DESCRIPTION OF THE DRAWINGS

The foregoing objects and features of the present invention will become apparent from the following description of preferred embodiments of the invention with reference to the accompanying drawings, in which.

DETAILED DESCRIPTION OF THE PREFERRED EMBODIMENTS

Figure 1:
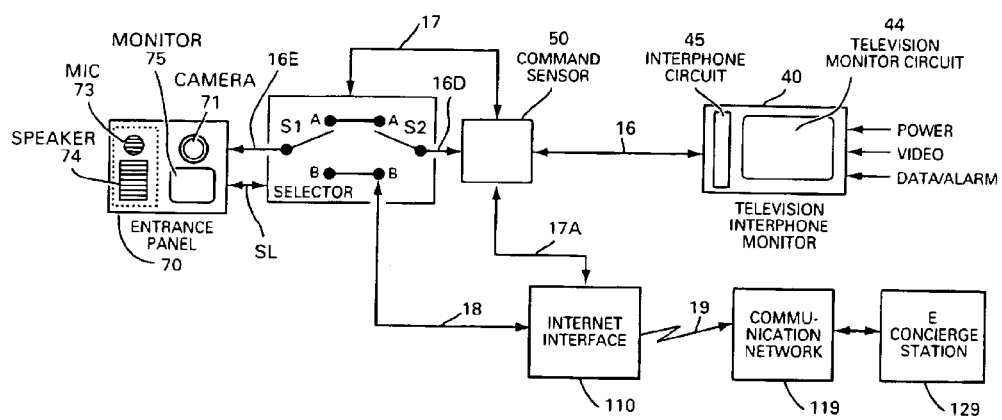
FIG. 1 is a block diagram of a television interphone monitor system with connection to the Internet according to a preferred embodiment of the present invention.

FIG. 1 shows an apparatus for connecting a single television interphone monitor system to an E concierge station over the Internet as a preferred embodiment when applying the present invention to a television interphone monitoring system. An information signal in the following description may consist of audio or video signals only, or a combination of video, audio, alarm, data and code signals propagated between an entrance panel, concierge or guard station and a television interphone monitor, and/or between an E concierge station and a television interphone monitor, and/or between and E concierge station and an entrance panel, concierge or guard station, and/or between E concierge station and a television interphone monitor, simultaneously with an entrance panel, concierge or guard station. A video signal in the following description may be a video portion of a composite video signal or a composite video signal or a digital video signal. Audio signals in the following description may be an analog or digital signals, while the video signal and/or the audio signal and/or the data signal may be compressed signals.

Referring to FIG. 1, the apparatus for connecting a television interphone monitor system to a concierge station over the internet comprises an entrance panel 70 incorporating a television camera 71, a microphone 73, a speaker 74, a display monitor 75 and selector keys (not shown) for transmitting and receiving an information signal, a command sensor 50 and a selector S1/S2 for receiving and transferring the information signals to and from the entrance panel 70, a transmission line 16 for propagating information signals between the television interphone monitor 40 and the command sensor 50 and for propagating information signals between the command sensor 50 via the selector S1/S2 and the entrance panel 70. The television interphone monitor 40 has a display monitor circuit 44 for displaying images and an interphone circuit 45 for receiving and generating information signals.

The television interphone monitor 40 further incorporates a data/alarm input for processing data and alarm signals and a video input for receiving video signals and for propagating the received data, alarm and video signals through the transmission line 16. The command sensor 50 extracts and decodes a command and control signals propagated via the transmission line 16 and feed a select command signal to selector S1/S2 through a command line 17 and to the internet interface 110 via a command line 17A.

The selector S1/S2 can be operated via a command signal generated from the television interphone monitor 40, through the command sensor 50 and the command line 17, or via a command generated from the E concierge station via the internet interface 110 and the connect line 18, or via a command generated from the entrance panel and fed to the selector S1/S2 via the select line SL. The selector S1/S2 can be commanded to connect the entrance panel 70 to the television interphone monitor 40 as shown in FIG. 1, or to the internet interface 110 by switching over S1 to B position or to both, the television interphone monitor 40 and the internet interface 110, by switching over both S1 and S2 to B position.

The selector S1/S2 can be further commanded to connect the television interphone monitor 40 to the internet interface 110 by switching over S2 only to B position. By such arrangement an E concierge station, the television interphone monitor 40 and/or the entrance panel 70 can be interconnected in any configuration. The selectors S1 and S2 are shown as a pair of mechanical switch-over switches, but the S1 and S2 can be any well known electronic analog or digital switches or matrix switches, which are widely available in different IC packages.

The internet interface 110 is fed with information signals via the connect line 18 and is activated to engage the E concierge station through the command line 17A and communicate with the E concierge station via the network line 19. The network line 19 can be any public or dedicated telephone line, hard wired, fiber optic or wireless. It can be a well-known networking line such as TCP/IP or ATM or Ethernet or it can be a communication line, directly connected to an Internet network provider or to the E concierge station.

The E concierge station 129, which will be described, is provided with human or electronic operators, having voice, video, control, alarm and data communication facilities including common codes, data, and information signals commensurating with the codes, data and information signals used for the television interphone monitor system.

Figure 2:
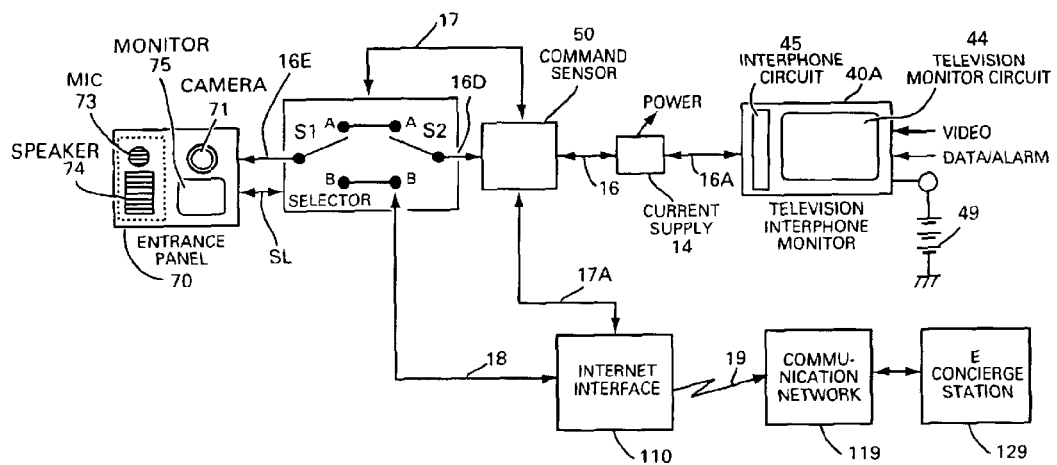
FIG. 2 is a block diagram of a television interphone monitor system shown in FIG. 1 wherein the television interphone monitor is powered via the information transmission line.

FIG. 2 shows a television interphone monitor system with a single television interphone monitor unit, identical to the system shown in FIG. 1 with the exception of a current supply 14 that is added between the transmission line 16 and the transmission line 16A connecting the television interphone monitor 40A to the current supply 14. The transmission line 16A carries a regulated current to operate the television interphone plus charge current to charge the rechargeable battery 49 that powers the television monitor circuit 44 of the television interphone monitor 40A, which unlike the television interphone monitor 40, is not connected to a power line.

The current supply 14, the charging of the battery and other details of the powering of the video interphone monitor 40A are not described here as they are fully described in the U.S. Pat. No. 5,923,363.

Figure 3:
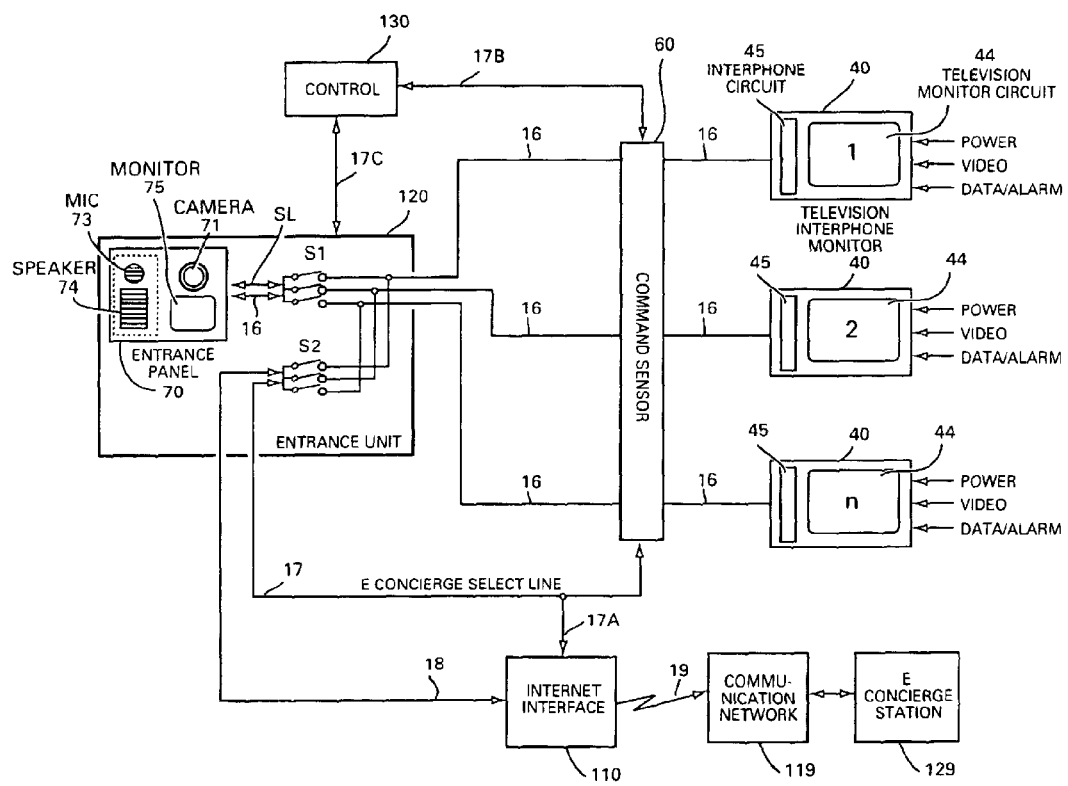
FIG. 3 is a block diagram of a multiple television interphone monitor system with a single entrance panel and with connection to the Internet according to a preferred embodiment of the present invention.

FIG. 3 shows an apparatus for connecting multiple television interphone monitors system to an E concierge station over the internet as a preferred embodiment, comprising the entrance panel 70 incorporating the television camera 71, microphone 73, speaker 74, display monitor 75 and selector keys (not shown) for transmitting and receiving an information signal, a command sensor 60 and two selectors S1 and S2 for receiving and transferring the information signals to and from the entrance panel 70, with the selectors S1 and S2 and the entrance panel 70 shown as part of an entrance unit 120, a plurality of transmission lines 16 for propagating information signals between two or more television interphone monitors 40, shown as 1, 2 and n, and multiple inputs command sensor 60 and for propagating information signals between the command sensor 60 via the selectors S1 and S2 and the entrance panel 70. Each of the television interphone monitors 40 comprises the display monitor circuit 44 for displaying images, and the interphone circuit 45 for receiving and generating information signals.

Similar to the television interphone monitor 40 of FIG. 1 each video interphone monitor further incorporates a data/alarm input for processing data and alarm signals and a video input for receiving video signals and for propagating the received data, alarm and video signals through a transmission line 16. The command sensor 60 extracts and decodes alarm, command and control signals propagated via the transmission lines 16 and feed select command signal to selector S1 and S2 through a command line 17 and to the internet interface 110 via a command line 17A. However, as the multiple system may generate large number of alarms, commands and controls the control circuit 130 may comprise a microprocessor for controlling multi tasks simultaneously, in accordance with the data fed to from the command sensor 60 through control/command line 17B.

The selectors S1 and S2 can be operated via a command signal generated from any of the television interphone monitors 40, through the command sensor 60 and the command lines 17, 17B and 17C or via a command generated from the E concierge station via the internet interface 110 and the connect line 18, or via a command generated from the entrance panel and fed to the selectors S1 and S2 via the select line SL. The selector S1 can be commanded to connect the entrance panel 70 to one of the television interphone monitors 40 while another television interphone monitor 40 may be connected via selector S2 to an E concierge station via the internet interface 110. It is also possible to connect the entrance panel 70 to the internet interface 110 via selectors S1 and S2, or to connect both the entrance panel 70 along with one of the television interphone monitors 40 to the internet interface 110. Such arrangement provides full flexibility in engaging the E concierge station from the entrance panel 70, any of the television interphone monitors 40 or both, or providing for separate communication lines, one between the entrance panel 70 and a television interphone monitor 40 and another between a television interphone monitor 40 and the E concierge station via the internet interface 110.

The selectors S1 and S2 are shown in FIG. 3 as a pair of manual selector switches, but similar to S1 and S2 of FIGS. 1 and 2 the selector S1 and S2 of FIG. 3 can be any well known electronic analog and digital switches or matrix switches, which are widely available in different IC packages.

Similar to the internet interface 110 of FIG. 1 the internet interface 110 of FIG. 3 is fed with information signals via the connect line 18 and is activated to engage the E concierge station through the command line 17A and communicate with the E concierge station via the network line 19. The network line 19 can be any public or dedicated telephone line, hard wired, fiber optic or wireless. It can be a well-known networking line such as TCP/IP or ATM or Ethernet or it can be a communication line, directly connected to an Internet network provider or to an E concierge station.

Similar to FIG. 1 the E concierge station is provided with human or electronic operators, having voice, video, controls, alarm and data communication facilities including common codes, data, and information signals commensurating with the codes, data and information signals used by the television interphone monitor system.

Figure 4:
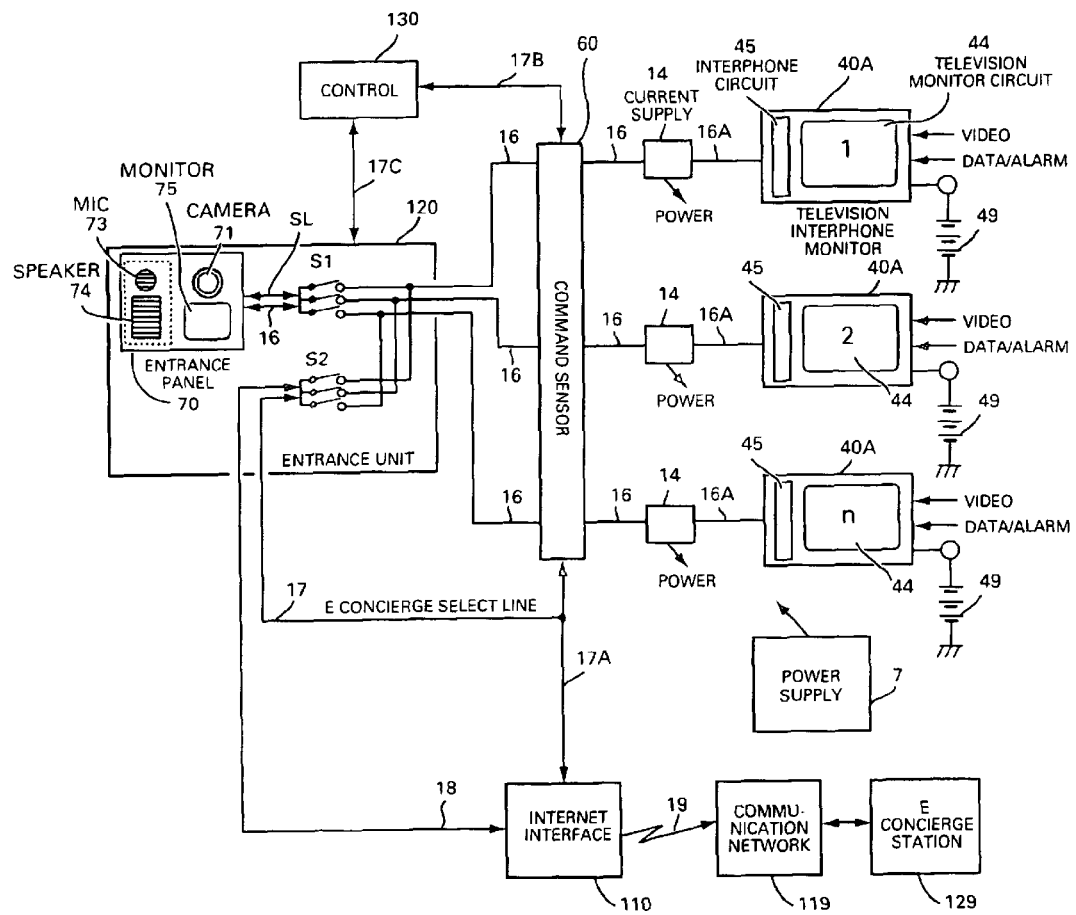
FIG. 4 is a block diagram of a multiple television interphone monitor system shown in FIG. 3 wherein the television interphone monitors are powered via the information transmission lines.

FIG. 4 shows a television interphone monitor system with multiple television interphone monitors 40A, identical to the system shown in FIG. 3 with exception of the multiple current supply units 14 which are added between the transmission lines 16 and 16A connecting the video interphone monitors 40a with the current supply units 14. The transmission line 16A carries a regulated current to operate the television interphone plus charge current to charge the rechargeable batteries 49 that power the television monitor circuits 44 of the television interphone monitors 40A, which unlike the television interphone monitors 40, are not connected to a power line.

The current supply 14, the charging of the batteries and details of the powering of the video interphone monitors 40A are fully explained in the U.S. Pat. No. 5,923,363.

Figure 5:
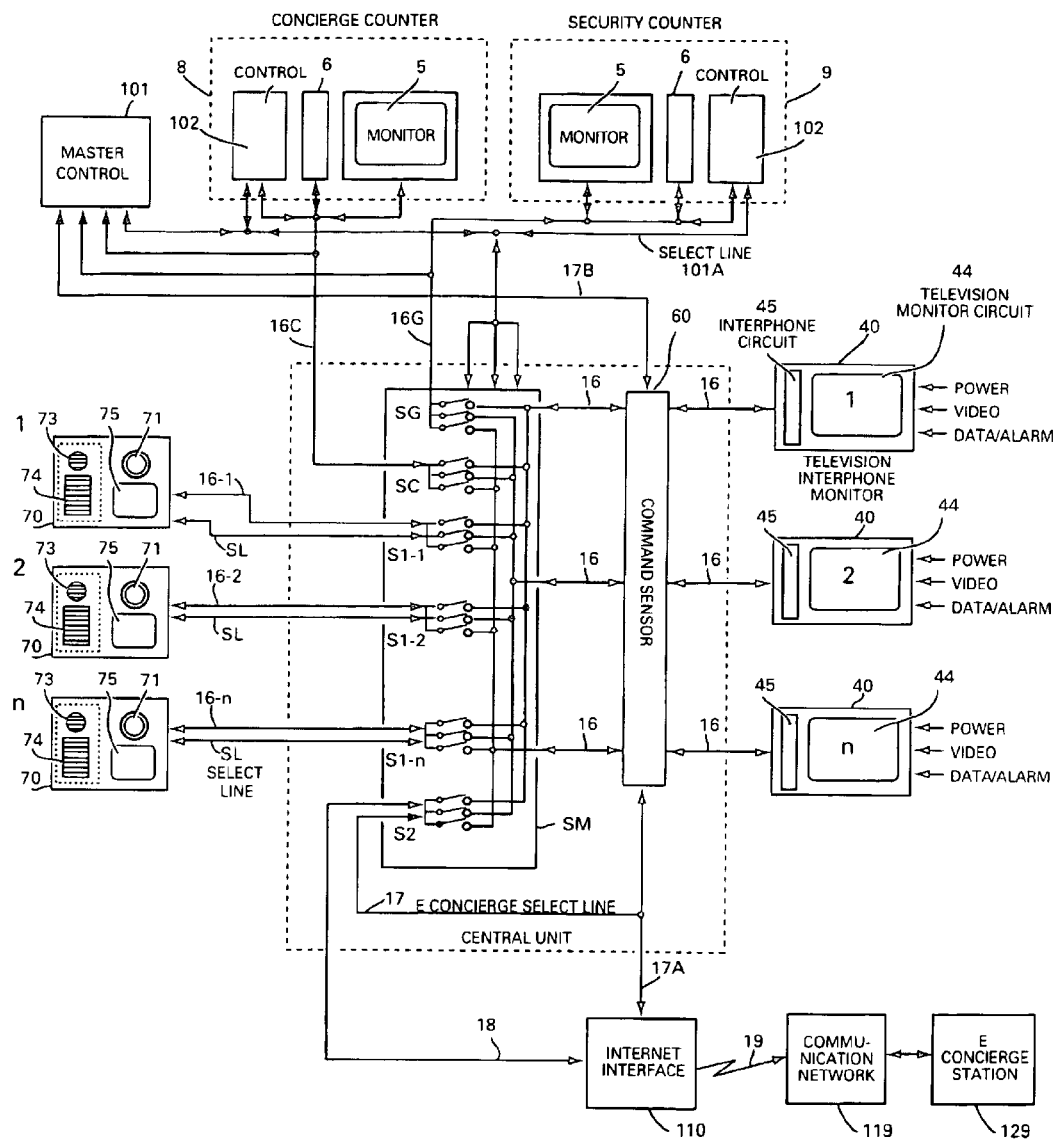
FIG. 5 is a block diagram of a multiple television interphone monitor system with multiple entrance panels, concierge and guard stations and with connection to the Internet according to a preferred embodiment of the present invention.

FIG. 5 shows an apparatus for connecting multiple television interphone monitors system to an E concierge station over the internet as a preferred embodiment, including multiple 1-$n$ entrance panels 70, each incorporating television camera 71, microphone 73, speaker 74, display monitor 75 and selector keys (not shown) for transmitting and receiving an information signal. The apparatus further has a concierge counter 8 and a security counter 9 each having a monitor 5 and an interphone unit 6 for generating and receiving information signals and a control unit 102 for generating and receiving select and control commands, the command sensor 60 and multiple selectors SG, SC, S1-1~S1-2, S1-$n$ and S2, which are combined into a matrix selector assembly SM for receiving and transferring the information signals to and from the entrance panels 70, the concierge counter 8, the security counter 9 and the television interphone monitors 40 through a plurality of transmission line 16, 16-1, 16-2, 16-$n$, 16C, 16G and 18 and the multiple inputs command sensor 60 for retrieving command signals from the information signals propagated through the command sensor 60. Each of the television interphone monitors 40 includes display monitor circuit 44 for displaying images, and an interphone circuit 45 for receiving and generating information signals and similar to the television interphone monitor 40 of FIG. 1 or FIG. 3, each video interphone monitor further incorporates a data/alarm input for processing data and alarm signals and a video input for receiving video signals and for propagating the received data, alarm and video signals through a respective transmission line 16. The command sensor 60 extracts and decodes alarm, command and control signals propagated via the transmission lines 16 and feed select command signal to a master control unit 101 and to the internet interface 110 via command lines 17A. The master control 101 commands and controls the control circuits 102 of the concierge counter 8, the security counter and the matrix selector assembly SM via select line 101A simultaneously, in accordance to the data fed to it from the command sensor 60 through control/command line 17B.

Each of the selectors S1-1 to S1-$n$ can be operated via a command signal generated from any of the television interphone monitors 40, through the command sensor 60 and the command lines 17B or via a command generated from the E concierge station via the internet interface 110 and the connect line 18, or via a command generated from an entrance panel and fed to the selectors S1-1 and S1-$n$ via the select lines SL. The selectors S1-1 to S1-$n$ can be commanded to connect each respective entrance panel 70 to one television interphone monitors 40, while other television interphone monitors 40 may be connected via selectors SG, SC and S2 to the concierge counter 8, the security counter 9 and to an E concierge station via the internet interface 110. It is also possible to connect an entrance panel 70 or the concierge counter 8 or the security counter 9 to the internet interface 110 via selectors SC or SG or S1-1 to S1-$n$ and S2, or to connect an entrance panel 70 or the concierge counter 8 or the security counter 9 along with one of the television interphone monitors 40 to the internet interface 110. Such arrangement provides full flexibility in engaging the E concierge station from any entrance panel 70, the concierge and/or the security counters and any of the television interphone monitors 40 individually or compoundly, or providing for separate communication lines, one between each entrance panel 70 and a television interphone monitor 40 and others between a television interphone monitor 40 and the concierge counter 8, the security counter 9 and E concierge station via the internet interface 110.

The selectors SG, SC, S1-1~S1-$n$ and S2 are shown in FIG. 5 as manual selector switches, but similar to S1 and S2 of FIG. 3 the selectors of FIG. 5 can be any well known array of relays or electronic analog or digital switches or matrix switches, which are widely available in different IC packages.

Similar to the internet interface 110 of FIG. 1 and FIG. 3, the internet interface 110 of FIG. 5 is fed with information signals via the connect line 18 and is activated to engage the E concierge station through the command line 17A and communicate with the E concierge station via the network line 19. The network line 19 can be any public or dedicated telephone line, hard wired, fiber optic or wireless. It can be a well-known networking line such as TCP/IP or ATM or Ethernet or it can be a communication line, directly connected to an Internet network provider or to an E concierge station.

The E concierge station, as explained above, is provided with human or electronic operators, having voice, video, controls, alarm and data communication facilities including common codes, data, and information signals commensurating with the codes, data and information signals used by the television interphone monitor system.

Figure 6:
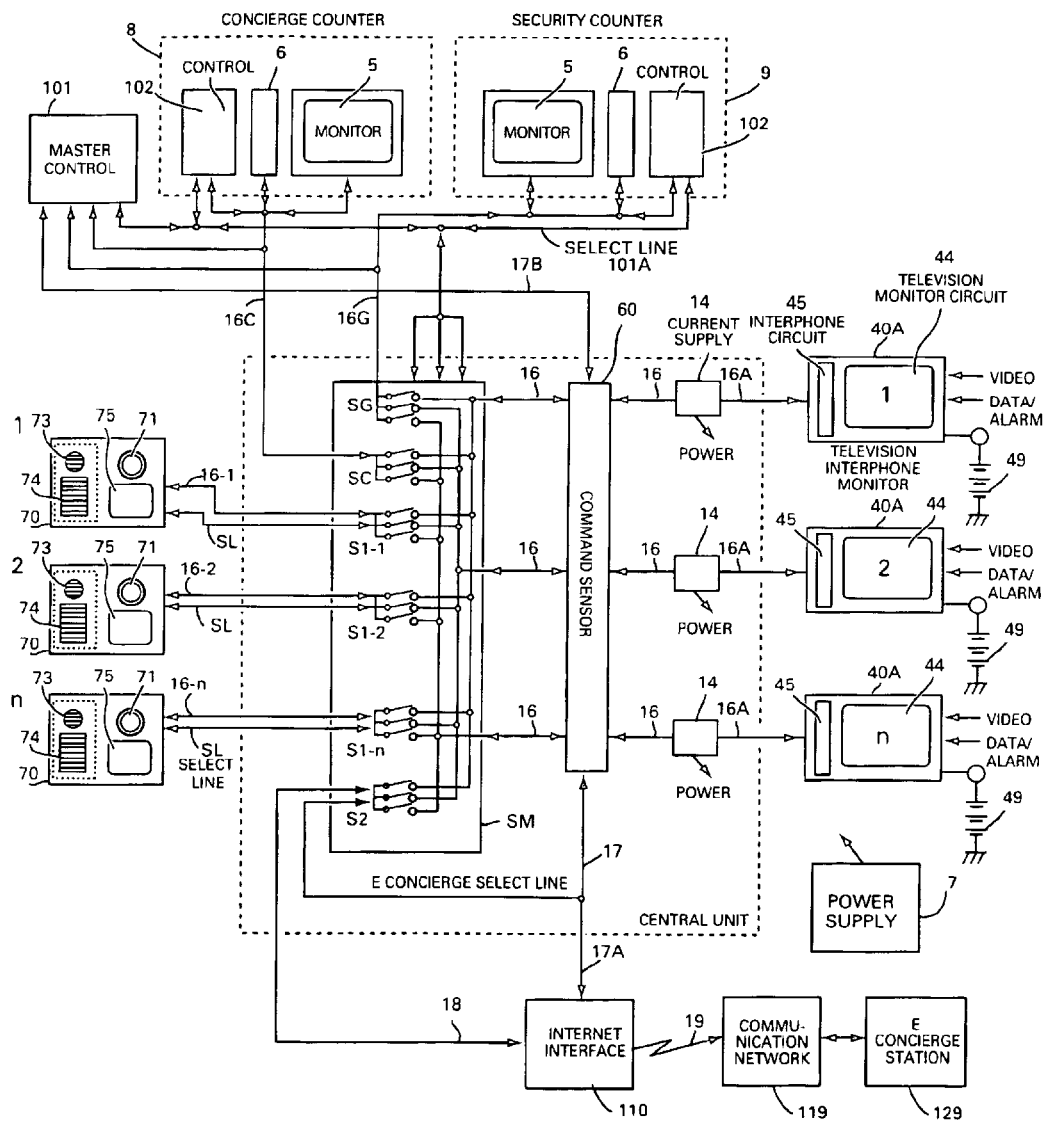
FIG. 6 is a block diagram of a multiple television interphone monitor system shown in FIG. 5 wherein the television interphone monitors are powered via the information transmission lines.

FIG. 6 shows a television interphone monitor system with multiple television interphone monitors 40A, identical to the system shown in FIG. 5 with exception of the multiple current supply units 14 which are added between the transmission lines 16 and 16A connecting the video interphone monitors 40$a$ with the current supply units 14. The transmission line 16A carries a regulated current to operate the television interphone plus charge current to charge the rechargeable batteries 49 that power the television monitor circuits 44 of the television interphone monitors 40A, which unlike the television interphone monitors 40, are not connected to a power line. The multiple current supply units 14 which are identical with the current supply units of FIG. 2 and FIG. 4 are fed with power supplied by a main power supply unit 7.

Figure 7:
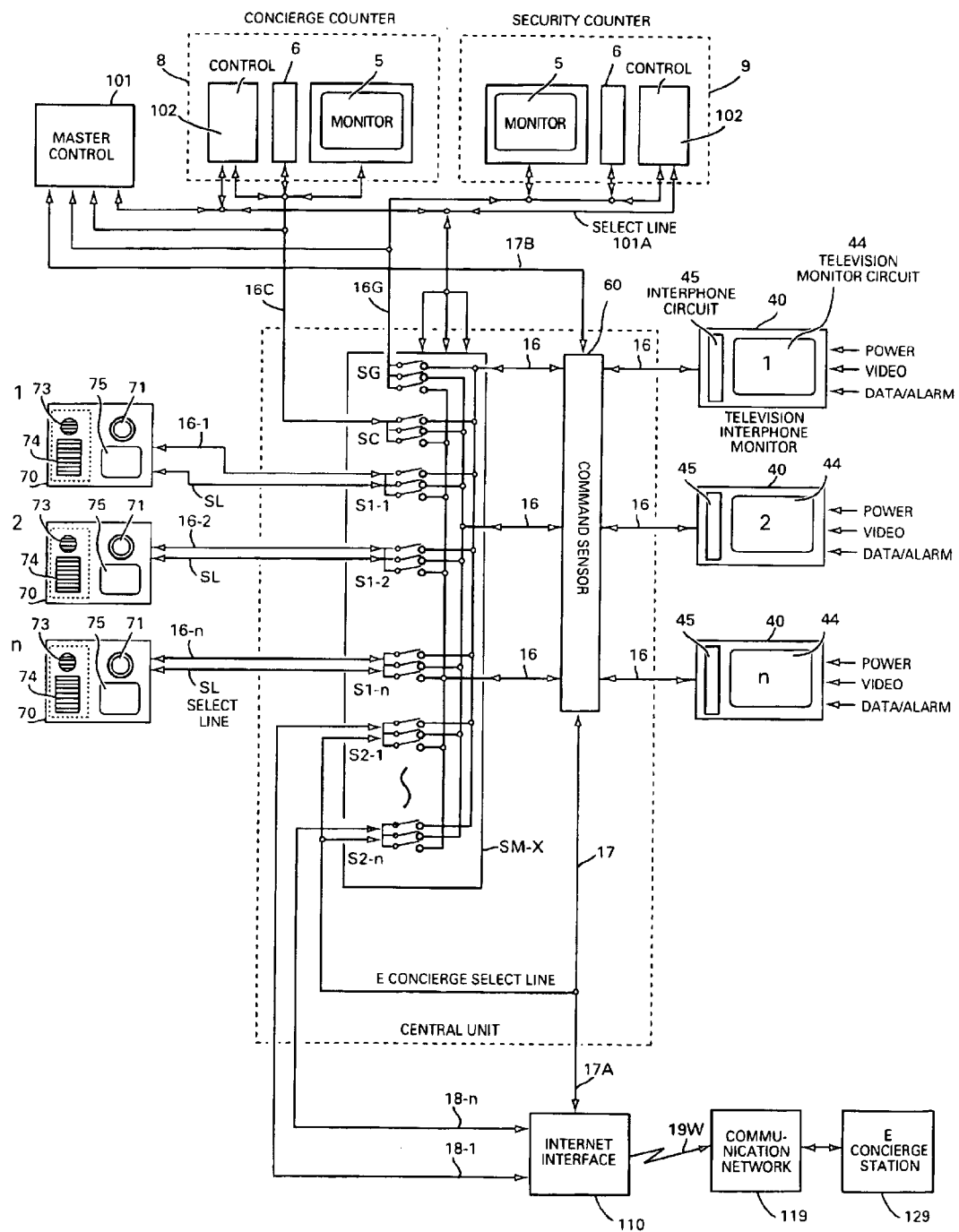
FIG. 7 is a block diagram of a multiple television interphone monitor system with multiple entrance panels, concierge and guard stations and with multiple connections to the internet interface unit according to a preferred embodiment of the present invention.
Figure 8:
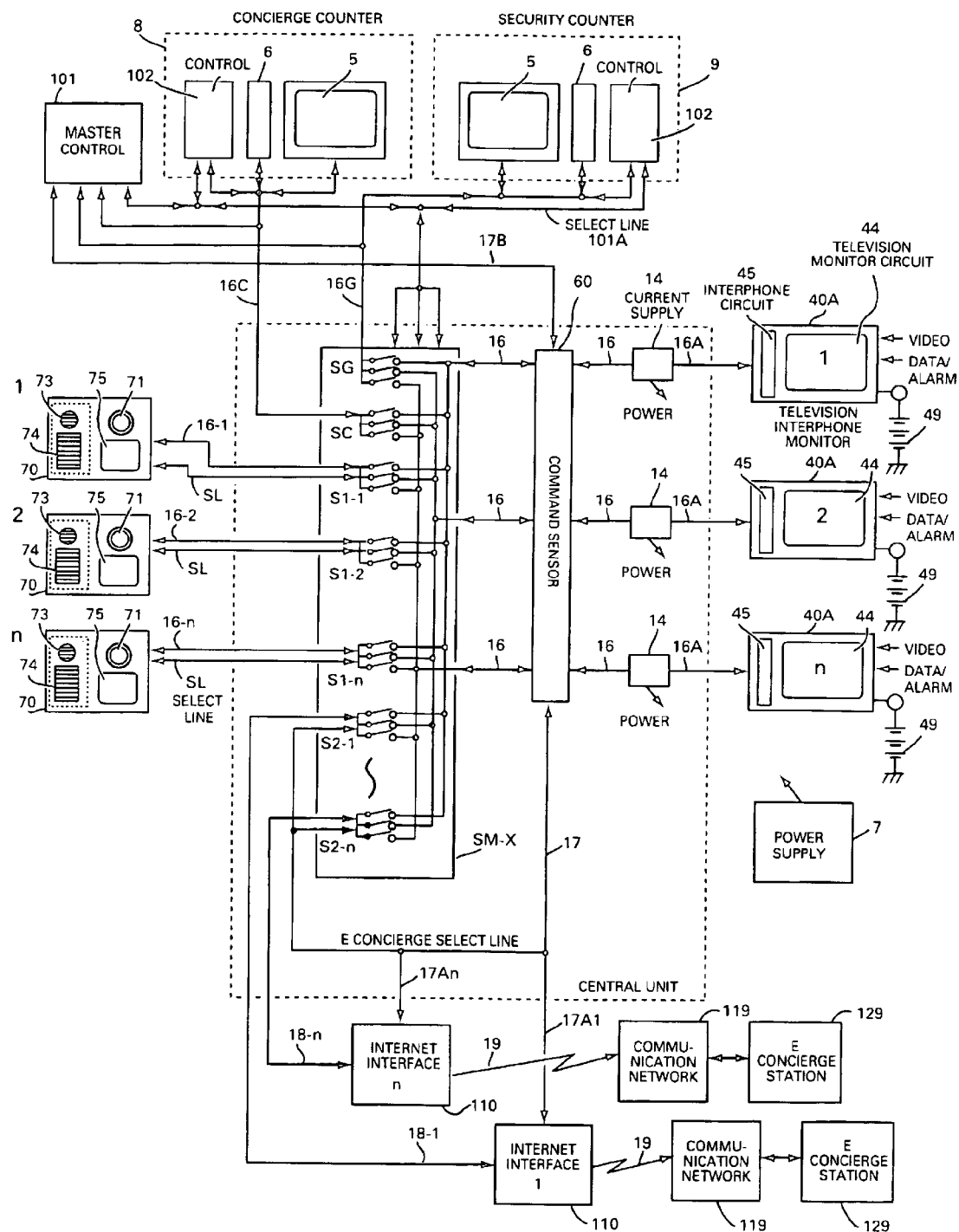
FIG. 8 is a block diagram of a multiple television interphone monitor system shown in FIG. 7 wherein the television interphone monitors are powered via the information transmission lines and wherein multiple internet interface units provide for multiple connections to the internet.

FIG. 7 shows a television interphone monitor system with multiple television interphone monitors 40A and multiple entrance panels 70, identical to the system shown in FIG. 5 with exception of the n selectors S2-1 to S2-$n$ which are added to an expanded matrix selector SM-X and the addition of n transmission lines 18-1 to 18-$n$ for connecting the selectors S2-1 to S2-$n$ with the internet interface unit 110. By this expanded arrangement the internet interface can handle up to n simultaneous connections with the E concierge station via wide bandwidth network line 19W which provides for two-way multiplexed transmission of plurality of information signals. On the other hand, FIG. 8 shows a television interphone monitor system similar to the system shown in FIG. 7 with the exception of the n number of internet interface units 110, each fed with individual information signal through connect line 18-1 and up to 18-$n$ and each internet interface individually engage the E concierge station via a network line 19. The multiple E concierge stations are identical with the E concierge station described in FIG. 3 and FIG. 5. The television interphone monitors 40A of FIG. 8 are powered via a transmission lines 16A by current supply unit 14, which is identical with the current supply unit 14 of FIG. 4 and FIG. 6. However, it is obvious that instead of the television interphone monitor 40A shown in FIG. 8 it is possible to use a television interphone monitors 40 shown in FIG. 7 or it is possible to replace the television interphone monitors 40 of FIG. 7 with video interphone monitors 40A and with current supply units 14. It is also obvious that it is possible to mix television interphone monitors 40 and television interphone monitors 40A in any of the systems shown in FIGS. 3, 4, 5, 6, 7 and 8. It is also obvious that n number of internet interfaces 110, each for connecting a single television interphone monitor 40 or 40A to an E concierge station via network line 19 can be mixed with n number of internet interfaces 110 each for connecting plurality of television interphone monitors 40 and/or 40A and/or entrance panels and/or concierge and/or security counter to the E concierge station via a wide band network line 19W.

Figure 9:
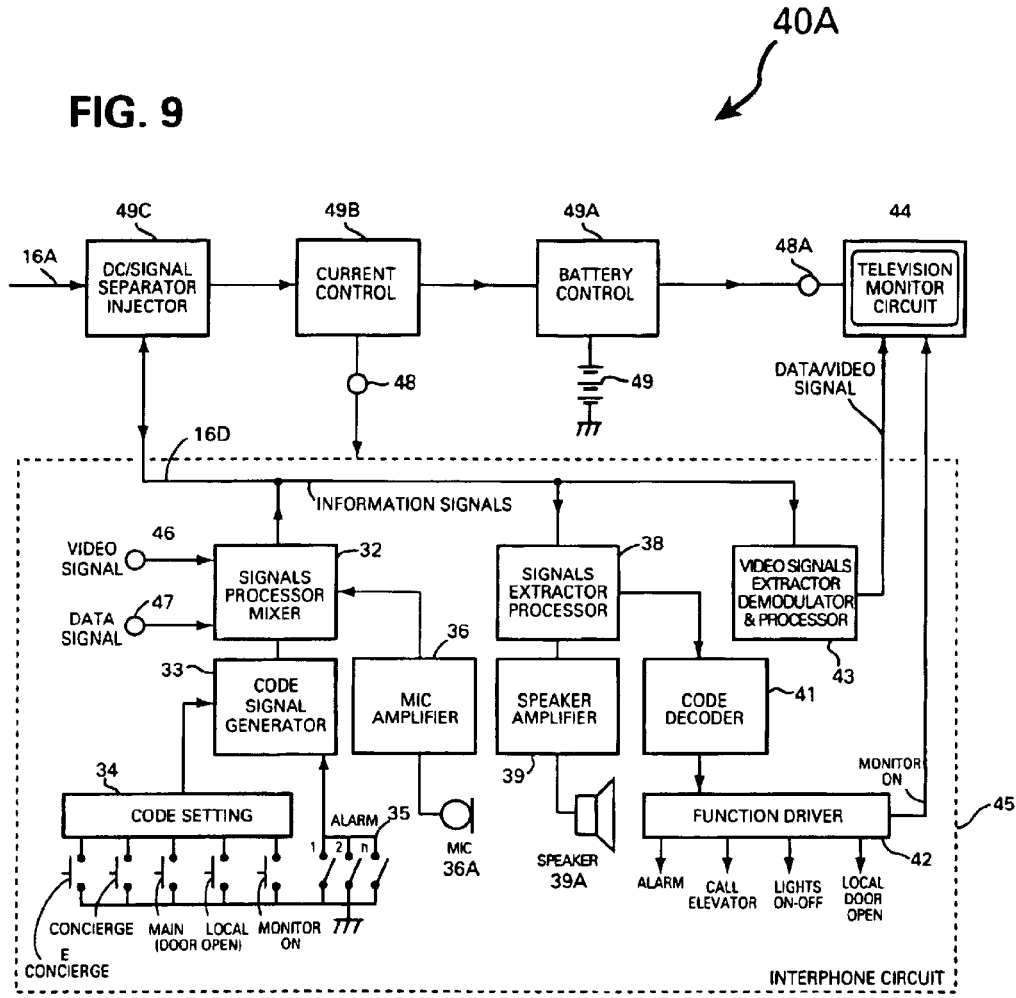
FIG. 9 is a block diagram of an electric circuit of a television interphone monitor of the apparatus shown in FIGS. 2, 4, 6 and 8.

As shown in FIG. 9 the video interphone monitor 40A is connected to a transmission line 16A through a DC-signal injector/separator circuit 49C for separating the DC from the received signals. The separator circuit 49C consists of a well-known coupling capacitor for coupling the signals and blocking the DC from the signal processing circuits and well known RF filters for removing the signals from the DC. The injector/separator circuit may consist of signal transformers for retrieving information signals from the DC and RF traps for the removal of the information signals from the DC line. The filtered DC line is fed from the injector/separator circuit 49C to a current control circuit 49B. The current control circuit 49B ensures that the interphone circuits 45 are fed with a controlled current through the terminal 48, and a trickle current for charging a Ni—Cd or other rechargeable battery 49 through the battery control circuit 49A. The battery control circuit further employs a switch for connecting the battery to the television monitor circuit through the terminal 48A for operating the monitor. The details of the regulated current supply and the use of the rechargeable battery are fully described in the U.S. Pat. No. 5,923,363. In contrast, the television interphone monitor 40 is operated from a power source directly fed to the terminals 48 and 48A and not by a regulated current through its transmission line 16; therefore the current control circuit 49B, the battery control circuit 49A, and the DC/signal separator portion of the DC/signal separator/injector 49C, the battery 49 are not used for the television interphone monitor 40.

The interphone circuit 45 of the television interphone monitors 40 or 40A includes a code setting circuit 34 for setting control and command codes such as opening the door lock or calling the elevator into a given floor or switching the lights on-off and/or code for operating the selector S1, S2, S1-1 to S2-$n$, respectively of FIG. 1 to FIG. 8 or for recalling the E concierge station. The alarm contacts 35 of the interphone circuit 45 shown in FIG. 9 will set an alarm command code when activated manually or automatically through peripheral alarm equipment such as a burglar alarm. The interphone circuit 45 also has a code signal generator 33 which generates control and code signals, such a generating well known dial-tone frequencies used for telephone networks or such well known RS422 or RS232 signals and feed the coded control signals consisting of dual tone frequencies or serial signals to signal processor/mixer 32 for mixing the coded control signals with the audio signal and/or with video signals fed through terminal 46 and/or with data signal fed through terminal 47 and injects the mixed signals into the transmission line 16 via the DC-signal injector/separator circuit 49C. The DC-signal injector/separator circuit 49C injects the mixed audio signals via the well known coupling capacitor or signal transformer. It may also use well-known transistor/buffer amplifier circuits for feeding the mixed signal into the transmission line 16A, or to the transmission line 16.

The code signal generator 33 of the interphone circuit 45 may consist of a digital pulse generator for transmitting digital pulse signals commensurate with the selected code, in which case the signal processor mixer 32 may generate pulse signals for mixing the digital pulses with the audio signals and for injecting the mixed audio signal into the transmission line 16 or 16A via the DC-signal injector/separator 49C. The interphone 45 also includes a microphone amplifier 36 coupled between the microphone 36A and the mixer 32, a signal extractor processor 38, a speaker amplifier 39 coupled to a speaker 39A, a code decoder 41 coupled to a function driver 42 and a video signal extractor demodulator 43, the functions of which will be explained below.

Figure 10:
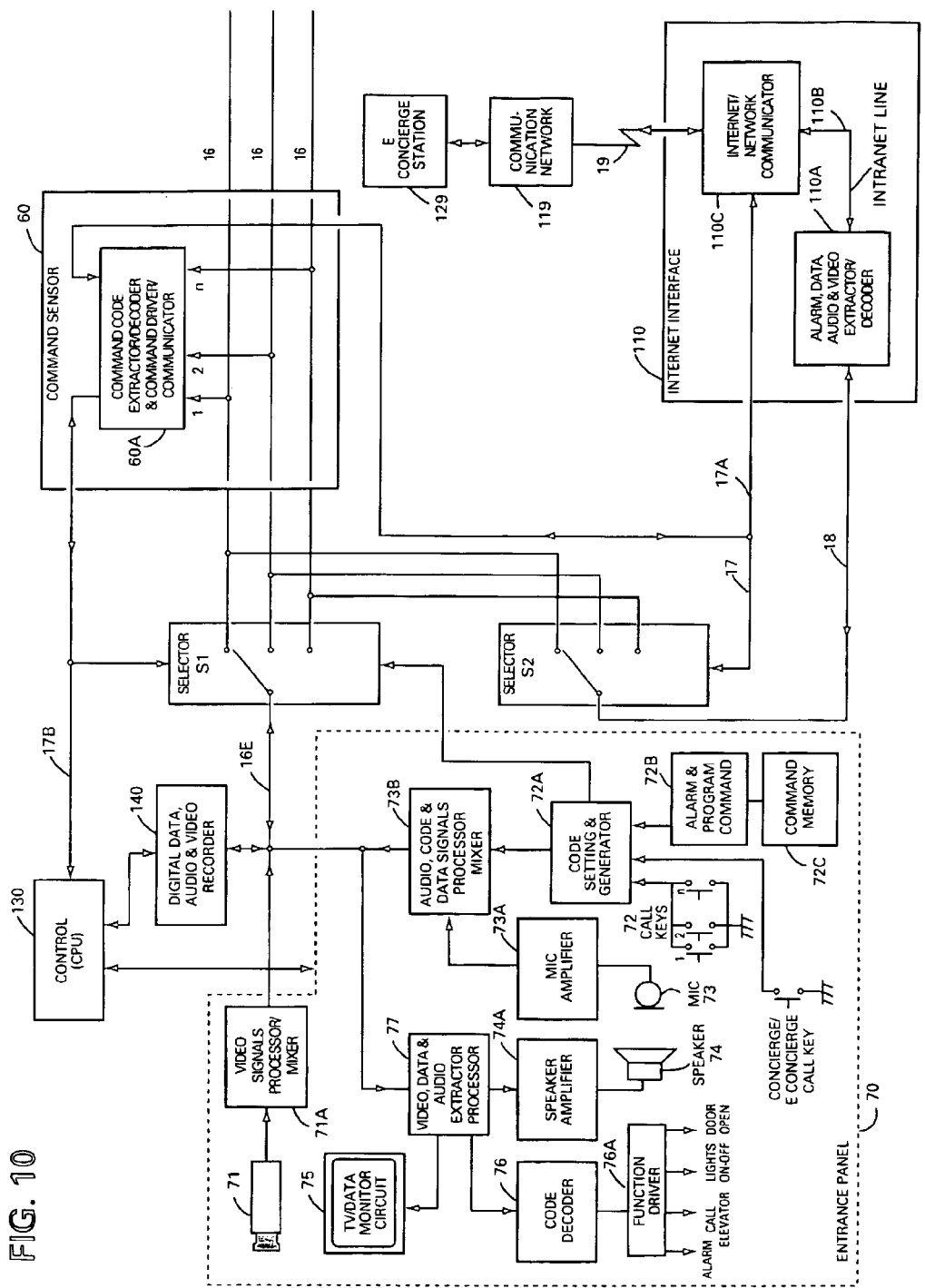
FIG. 10 is a block diagram of an electric circuit showing an entrance panel with matrix switching, along with a command and control circuit portions and their connections to an Internet interface unit, according to the preferred embodiment of the present invention.

As shown in FIG. 10 the entrance panel 70 includes a code setting and generating circuit 72A for setting control codes and generating control signals similar to the codes generated by the code setting circuit 34 and code signal generating circuit 33 of FIG. 9 such as activating a ringer, or opening the door lock or calling the elevator into a given floor or switching the lights on-off, call keys 72 for addressing a video interphone monitor of a given apartment, alarm and program command circuit 72B and command memory for setting alarm and other command codes which can be activated manually or automatically through peripheral alarm equipment such as burglar alarm and an E concierge call key for engaging the E concierge station. The code signal setting and generating circuit 72A may consist of a dual-tone dialer IC for generating well known dial-tone frequencies used for telephone networks, or an IC for generating serial signals such as RS422 or RS232 or an IP network signals such as used for TCP/IP, Ethernet or ATM network. The coded control signals consisting of a single or a group of dual tone frequencies or serial signals are fed from the code signal setting and generator circuit 72A to an audio signal processor/mixer circuit 73B for mixing the coded control signals with the audio signals and for injecting the signals into transmission line 16E and to the selector S1.

The code for calling and engaging the E concierge station can consist of well known telephone numbers for calling and engaging the E concierge station through public telephone lines or public ISDN lines, or it can be an IP code for addressing the E concierge station through a network provider, such as the Internet. The code for calling and engaging the E concierge station may be a combination of telephone number and an IP code, and may include a password, such as used with PCs and within the Internet communications. As will be explained, the code setting circuit 34 of FIG. 9 and the code setting circuit 72A of FIG. 10 need not communicate the final engage call for engaging the E concierge station, as such engage call is generated by the Internet interface unit 110 on the basis of an E concierge call code set by the code setting circuits 34 or 72A.

The code signal generator 72A shown in FIG. 10 may consist of a digital pulse generator for transmitting digital pulse signals commensurate with the selected code, in which case the audio signal processor mixer 73B may generate pulse signals for mixing the pulse signals with the audio signals and for injecting the mixed audio signal into the transmission line 16E.

The signal extractor processor 38 of the circuit 45 shown in FIG. 9 extracts the audio signal from the information signals and the code decoding circuit 41 decodes the control codes fed from the signal extractor/processor 38 and feed the decoded code signal to the function driver 42 which drives the call ringer and switches the monitor circuit 44 on, or switches the lights on-off or activates an alarm. The code decoder 41 consist of a dual-tone or serial signal decoder IC for decoding the well known dial-tone frequencies used for telephone networks or the serial signals content and feeds the decoded control signals to the function driver 42. The function driver 42 consists of electronic switching/driving devices such as transistors or multiplexers ICs, or relays, or photo couplers or other well-known switching/driving devices.

The signal extractor/processor 38 extracts the audio signal from the information signals by using well known low pass filters for extracting the lower frequency audio signals from the information signals fed from the information signal line 16D. The extracted audio signals are also fed to the speaker amplifier 39 and to the speaker 39A. The microphone 36A, microphone amplifier 36, speaker 39A and speaker amplifier 39 use well known audio components for amplifying the received audio signals and the microphone audio signals. The microphone amplifier 36 feeds the microphone signals to the signal processor/mixer 32 for feeding the mixed audio and microphone signals through the information signal line 16D to the DC-signal separator/injector 49C for injecting the mixed audio and microphone signals to the transmission line 16, or to the transmission line 16A.

If the coded control signals generated by the code signal generator 33 of circuit 45 shown in FIG. 9 or the code signal setting and generating circuit 72A shown in FIG. 10 are serial signals or digital signals or pulse signals, the code decoder 41 shown in FIG. 9 and the code decoder 76 shown in FIG. 10 will employ a well known band pass filter for extracting the digital signal or pulse signals and a digital decoder for decoding the coded signals.

It is apparent from the above description that the two-way audio signals generated by the entrance panels 70 shown in FIG. 10 and the audio signals generated by the television interphone monitor 40 or 40A can be propagated along with two-way control signals and alarm signals between the entrance panel and the television interphone monitor via transmission line 16 and/or 16A that carries regulated current to operate the interphone circuits 45 of the television interphone monitor 40A and a charge current to charge the rechargeable battery 49 for operating the television monitor circuit 44 of the television interphone monitor 40 or 40A without disturbing the information signals by the random current drain and/or current surges caused by random activation of the monitor.

As shown in FIG. 10, the well-known television camera 71 feeds composite video signals to the video signal processor mixer 71A. The video signal processor mixer uses well known frequency modulation IC to modulate the composite video signals onto a carrier frequency which keeps the lower frequency range of the modulated video signal above the upper frequency range of the audio signals thereby permitting the video signals to be injected into a common transmission line 16E used for the audio signals without disturbing the audio signals. In the preferred embodiment the video signal processor mixer 72 may further comprise a well known differential signal converter IC for converting the modulated video signals into different signals and feeding the differential signals into the transmission line 16E and into the information transmission line 16 via selector S1 and current supply unit 14, or the video signal processor mixer 71A may include a well known compression circuit for digitizing and compressing the video signals and feeding a well known compressed video signals through the transmission line 16E to the information transmission line 16 via selector S1.

The video signal extractor demodulator and processor 43 of the interphone circuit 45 shown in FIG. 9 extracts from line 16D the frequency modulated video signals or the differential signals or the compressed video signals by using a well known band pass filter and demodulates the extracted video signal by using well known ICs and other peripheral components to feed the television monitor circuits 44 with a demodulated video signal for displaying an image of the visitor at the entrance onto the screen of the television monitor circuit 44. The television monitor circuit is activated via the function driver circuit 42 on the basis of a command fed to it from the code decoder 41.

It has also been apparent from the above description that information signals composed of the video signal along with audio signal, control signals and alarm signals are transmitted from the entrance panel and/or the entrance unit to the television interphone monitor through a common transmission line.

The signal processor mixer circuit 32 of FIG. 9 comprises a similar video signals processing circuits of the video signal processor mixer 71A of FIG. 10 described above, as well as digital data signals processing circuit of the signals processor mixer 73B of FIG. 10, thereby any video signals and data signals fed to terminals 46 and 47 of FIG. 9 respectively are processed, mixed and injected into the transmission line 16 or 16A via the DC/signal separator injector 49C and through the transmission line 16D.

The video, data and audio extractor processor 77 of the entrance panel feeds the extracted decoded video signals to the TV/data monitor circuit 75 of FIG. 10 the same way the video signals extractor demodulator and processor 43 of FIG. 9 feed the video signals to the television monitor 44.

The controller 102 of the concierge counter 8 and the controller 102 of the security counter room 9, shown in FIG. 5 to FIG. 8 can receive control data from the master controller 101 and the matrix selector assembly SM and transmit overriding control and selector select signals to the controller 101 and the matrix selector assembly SM or SM-X. A signal fed from the matrix selector assembly SM or SM-X to the controller 101 or controller 102 contains switching-on or switching-over data, which provide the security guards and the concierge with information and status of visitors, callers and alarm. The interphone circuits 6 of the concierge counter 8 and of the security counter 9 are identical to the interphone circuit 45 of the television interphone monitor 40 or 40A of FIG. 9 while the monitor circuits 5 can be similar to the television monitor circuit 44 also shown in FIG. 9 or any other television monitor circuit. Accordingly, it is possible for the concierge counter 8 or the security counter 9 to receive and transmit audio, video, control, data or alarm signals from and to any individual television interphone monitor 40 or 40A and/or from and to any of the entrance panels 70 and/or from and to the E concierge station via the internet interface 110. Such arrangement permits the concierge or the security guard a total flexibility to communicate with each tenant or visitor, or interfere in case of emergency into visitor-to-tenant calls and/or communicate with the E concierge center, directly or together with any of the tenants or visitor or both.

The master control circuit or controller 101 of FIG. 5 to FIG. 8 and the controller 130 of FIG. 3, FIG. 4 and FIG. 10 are fed with control and command signals from the command sensors 60. The command sensor 60 consists of a command code extractor/decoder and command driver communicator circuit 60A, comprising multiple inputs 1, 2 and up to n, each connects to one of the transmission lines 16 1,2-n for receiving an information signals. The extractor/decoder portion of the circuit may comprise multiple n circuits each comprising a signal extractor/processor and a code decoder similar to the signals extractor processor 38 and code decoder 41 of FIG. 9. To reduce the number of the signal extractor/processor and decoder circuits the lines 16 can be connected to a single signal extractor circuit via a scanning circuit which scans the transmission line one after another in sequence, in a continues closed loop and feed the information signals one after the other to the input of the single signals extractor processor circuit, which is similar to the circuit 38 of FIG. 9, or a given number of lines 16 may be scanned individually by a given number of n scanners and each output of a scanner feeds the information signals to n number of signal extractor/processor circuits, each similar to the circuit 38 of FIG. 9 for outputting an extracted signals.

The extracted signals are fed to a code decoder similar to the code decoder 41 of FIG. 9 and the decoded code is fed from the command sensor to the master controller 101 or to the controller 130 of FIG. 3 to FIG. 8 and FIG. 10 via command line 17B, and to the selector S1, or S10 or to the matrix selector assembly SM or SM-X of FIG. 1 to FIG. 8 and FIG. 10 via E concierge select line 17. The master controller 101 or the controller 130 feed given commands to the entrance panel, such as command to switch on the light, activate a digital data, audio and/or video recorder 140 and or recall the concierge, or the security guard, or activate any other function of the system. In parallel the command line 17B feeds via the controllers 130 or 101 and via the select line 101A or 17C or directly to the selector S1 or S10 or SM or SM-X a command for connecting a selector S1, or S10 or SC or SG, corresponding to the received command, to the television interphone monitor 40 or 40A that is generating an engage command. The engage command to connect a video interphone monitor 40 or 40A to an E concierge station is fed from the command sensor 60 via E concierge select line 17 to the selector S2 or to the selectors S2-1 to S2-n and via command line 17A to the internet interface unit 110.

The internet interface 110 as shown in FIG. 10 includes an alarm, data, audio and video extractor/decoder circuit 110A comprising circuits similar to the signals processor mixer 32, code signal generator 33, signals extractor processor 38, code decoder 41 and video signals extractor, demodulator and processor 43 of the interphone circuit 45, and therefore the circuit 110A of the internet interface unit 110 can extract, mix, decode and code audio, video, alarm, control and data signals two way for communicating two-way information signals through the selector S2 and through the connect line 18 the same way the television interphone monitors 40 or 40A and/or the entrance panels 70 or the concierge counter 8 or the security counter 9 communicate two-ways. The alarm, data, audio and video extractor/decoder 110A also receives and feeds audio, video, alarm, control and data signals, similar to the input signals fed to the signal processor or the mixer 32 of FIG. 9 and similar to the output signals fed from the signal extractor processor 38 and the video signals extractor, demodulator and processor 43 of FIG. 9, through the intranet line 110B.

Connected to the intranet line 110B, the internet/network communicator 110C can be a well known PC, portable PC, a palm PC or a custom programmed internet/network communicator, adapted to receive a control code signal via the command line 17A or via the alarm, data, audio and video extractor decoder 110A and to process the interfaced audio, video, data, alarm and control signals and to generate an engage call signal to an E concierge station via the network line 19. Depending on the bandwidth of the network line 19 and the speed capabilities of the PC or the custom programmed internet/network communicator 110C, the internet interface 110 may further include n number of alarm, data, audio and video extractor/decoder circuits 110A to process a single or simultaneously n number of E concierge calls to a single or a multiple of E concierge stations, by interfacing the voice (audio), pictures (video), data, alarm and control signals of a single or a multiple of television interphone monitors and/or entrance panels and/or concierge and security counters of the video interphone monitor system.

As the speaker 39A and the microphone 36A of FIG. 9, and the speaker 74 and the microphone 73 of FIG. 10 can be enclosed inside a handset, such as used for telephones and as the code setting keys of the code setting circuit 34 of FIG. 9 and the call keys 72 of FIG. 10 can be a touch keys of a monitor screen 44 of FIG. 9 or 75 of FIG. 10 it is becoming apparent, that the method and apparatus for connecting a television interphone monitor system of present invention offer convenience and simplicity for the recalling of an E concierge station by a simple key touch of a touch screen of the television interphone monitor, and simple voice communication with the E concierge station, using the interphone handset.

The single or multiple E concierge stations 129 shown in FIG. 1 to FIG. 8 and in FIG. 10 are connected to the network line 19 or 19W via a communication network 119, which can be a dedicated network or a well known public provided network such as ISDN or Internet or public telephone exchange.

The operators of the E concierge station can be provided with handsets or a head mounted microphone and speaker for communication by voice with visitors that are calling tenants through an entrance panel 70 of a building, or directly with tenants through a television interphone monitor 40 or 40A inside the apartment, or with a concierge or with a security guard, or with a combination of a visitor, a tenant and/or concierge and security guard.

The E concierge station may be further provided with monitors for observing the visitors, and/or with digital video and audio recorder, or VCR to record the visitor's images and/or voice communications, and in instances that a video camera associated and connected to the television interphone monitor 40 or 40A is active, it can record the images and/or communication from within the apartment.

Since the data and information pertaining to a tenant, the system location and other information can be stored in a memory circuit such as data stored in the command memory circuit 72C shown in FIG. 10, the information and data can be transferred to the E concierge station automatically, and a display screen in front of the operator of the E concierge station can display all necessary information, such as the caller name, address or even the caller's credit card number, when such number is stored in the system.

The operator of the E concierge station can therefore handle many tasks, including the tasks of answering visitors, or to attend and handle certain specifically diverted calls from visitors to certain tenants of a building.

The operator of an E concierge station can further transmit control signals such as, opening the door, switching on-off the lights, calling the elevator to a given floor and the like. Furthermore, the E concierge operator, can provide services such as purchasing tickets to a show, calling medical doctors or ambulances, providing contacts to repair personnel such as electricians, plumbers or painters and the like and also provide purchasing services, including grocery deliveries from nearby supermarket or fast food chains and many other services that are requested by tenants, visitors or by a local concierge or guard of a building.

For effectively providing wide ranging services, the E concierge station can generate product selection menus and catalogs or price lists for display onto the monitors 44 of the television interphone monitor 40 or 40A, and/or onto the monitors 5 of the concierge or guard counters or onto the TV/data monitor circuit 75 of FIG. 10.

In order to reduce the volume of data and signals over the network line 19, the selection menus and catalogs or price lists can be stored into a memory, such as hard disk drive of a PC or of a custom programmed internet/network communicator 110C, to be recalled for display onto monitors 44 or monitors 5 or onto TV/data monitor circuit 75, by the operator of the E concierge station, or by the local concierge or guard or by the tenant. The storing of all the service data into a local PC 110 substantially improves the speed and the efficiency of the services the E concierge station is provided by its capability to instantly recall many service displays, regardless of the bandwidth of the network line 19 and/or the communication network 119.

According to the method and apparatus for connecting a television interphone monitor system to an E concierge station shown in FIG. 1 to FIG. 8 the television interphone monitors can be powered through their respective transmission lines or directly via a power line and connect to the entrance panel, or entrance unit, or to a concierge or to a security guard or to an E concierge station by a simple apparatus in an arbitrary combination with each other, whereby one, two or any arbitrary entrance panels can be connected to a plurality of arbitrary television interphone monitors through the transmission lines connecting the television interphone monitor and via the current supply units, while other entrance panels and/or television interphone monitor station and/or a concierge or security guard can be connected to an E concierge station via the internet.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. An apparatus for connecting a television interphone monitor system to an E concierge station via a communication network selected from the group consisting of dedicated network, public network and the Internet, comprising:

a television interphone monitor connected via internal communication line and a matrix selector with an entrance panel and with an interface unit;

wherein said television interphone monitor and said entrance panel include select keys and are adapted to process information signals including a combination of signals selected from the group consisting of audio signals, video signals, control signals, alarm signals and data signals through said matrix selector and through said internal communication line for communicating selectively between said television interphone monitor with said entrance panel and said interface unit and between said entrance panel and said interface unit;

said interface unit is adapted to process said information signals and communicate interfaced information signals with said E concierge station via said communication network;

wherein one or more of said select keys generate an engage call signal to said interface unit for engaging and connecting said E concierge station through said communication network for communicating said interfaced information signals between one of said television interphone monitor and said entrance panel with said E concierge station through said interface unit; and wherein said matrix selector comprises digital switches for selectively routing said information signals between said television interphone monitor, said entrance panel and said interface unit.

2. The apparatus for connecting a television interphone monitor system to an E concierge station via a communication network according to claim 1, wherein said internal communication line is connected to a regulated current supply unit for supplying regulated current to said television interphone monitor via said internal communication line for operating said television interphone monitor and for charging a rechargeable battery associated with said television interphone monitor.

3. An apparatus for connecting a television interphone monitor system to an E concierge station via a communication network selected from the group consisting of dedicated network, public network and the Internet, comprising:

a television interphone monitor connected via internal communication line and a matrix selector with a plurality of entrance panels and with an interface unit;

wherein said television interphone monitor and said plurality of entrance panels include select keys and are adapted to process information signals including a combination of signals selected from the group consisting of audio signals, video signals, control signals, alarm signals and data signals through said matrix selector and through said internal communication line for communicating selectively between said television interphone monitor and any one of said plurality of entrance panels and said interface unit and between said any one of said entrance panels and said interface unit;

said interface unit is adapted to process said information signals and communicate interfaced information signals with said E concierge station via said communication network;

wherein one or more of said select keys generate an engage call signal to said interface unit for engaging and connecting said E concierge station through said communication network for communicating said interfaced information signals between one of said television interphone monitor and any one of said entrance panels with said E concierge station through said interface unit; and wherein said matrix selector comprises digital switches for selectively routing said information signals between said television interphone monitor, said entrance panels and said interface unit.

4. The apparatus for connecting a television interphone monitor system to an E concierge station via a communication network according to claim 3, wherein said internal communication line is connected to a regulated current supply unit for supplying regulated current to said television interphone monitor via said internal communication line for operating said television interphone monitor and for charging a rechargeable battery associated with said television interphone monitor.

5. An apparatus for connecting a television interphone monitor system to an E concierge station via a communication network selected from the group consisting of dedicated network, public network and the Internet, comprising:

a plurality of television interphone monitors connected via internal communication lines and a matrix selector with at least one entrance panel and with an interface unit;

wherein said television interphone monitors and said at least one entrance panel include select keys and are adapted to process information signals including a combination of signals selected from the group consisting of audio signals, video signals, control signals, alarm signals and data signals through said matrix selector and through said internal communication lines for communicating selectively between any one of said plurality of television interphone monitors with said at least one entrance panel and said interface unit and between said at least one entrance panel and said interface unit;

said interface unit is adapted to process said information signals and communicate interfaced information signals with said E concierge station via said communication network;

wherein one or more of said select keys generate an engage call signal to said interface unit for engaging and connecting said E concierge station through said communication network for communicating said interfaced information signals between at least one of said television interphone monitor and said entrance panel with said E concierge station through said interface unit; and wherein said matrix selector comprises digital switches for selectively routing said information signals between said television interphone monitors, said at least one entrance panel and said interface unit.

6. The apparatus for connecting a television interphone monitor system to an E concierge station via a communication network according to claim 5;

wherein said internal communication lines are connected to a regulated current supply units for supplying regulated current to said plurality of television interphone monitors via said internal communication lines for operating said television interphone monitor and for charging a rechargeable batteries associated with said television interphone monitors.

7. An apparatus for connecting a television interphone monitor system to an E concierge station via a communication network selected from the group consisting of dedicated network, public network and the Internet, comprising:

a plurality of television interphone monitors connected via internal communication lines and a matrix selector with a plurality of entrance panels and with at least one interface unit;

wherein said television interphone monitors and said entrance panels include select keys and are adapted to process information signals including a combination of signals selected from the group consisting of audio signals, video signals, control signals, alarm signals and data signals through said matrix selector and through said internal communication lines for communicating selectively between any one of said plurality of television interphone monitors with any one of said plurality of entrance panels and said at least one interface unit and between at least one of said plurality of entrance panels and said at least one interface unit;

said at least one interface unit is adapted to process said information signals and communicate interfaced information signals with said E concierge station via said communication network;

wherein one or more of said select keys generate an engage call signal to said at least one interface unit for engaging and connecting said E concierge station through said communication network for communicating said interfaced information signals between at least one of said television interphone monitors and at least one of said entrance panels with said E concierge station through said interface unit; and wherein said matrix selector comprises digital switches for selectively routing said information signals between said television interphone monitors, said entrance panels and said interface unit.

8. The apparatus for connecting a television interphone monitor system to an E concierge station via a communication network according to claim 7, wherein said internal communication lines are connected to a regulated current supply units for supplying regulated current to said television interphone monitors via said internal communication lines for operating said television interphone monitors and for charging a rechargeable batteries associated with said television interphone monitors.

9. An apparatus for connecting a television interphone monitor system to an E concierge station via a communication network selected from the group consisting of dedicated network, public network and the Internet, comprising:

a plurality of television interphone monitors connected via internal communication lines and a matrix selector with a plurality of entrance panels and with a plurality of interface units;

wherein said television interphone monitors and said entrance panels include select keys and are adapted to process information signals including a combination of signals selected from the group consisting of audio signals, video signals, control signals, alarm signals and data signals through said matrix selector and through said internal communication lines for communicating selectively between any one of said plurality of television interphone monitors with any one of said plurality of entrance panels and any one of said plurality of interface units and between any one of said plurality of entrance panels and any one of said plurality of interface units;

said plurality of interface units are adapted to process said information signals and communicate interfaced information signals with said E concierge station via said communication network;

wherein one or more of said select keys generate an engage call signal to any one of said plurality of interface units for engaging and connecting said E concierge station through said communication network for communicating said interfaced information signals between at least one of said television interphone monitors and at least one of said entrance panel with said E concierge station through at least one of said interface units; and wherein said matrix selector comprises digital switches for selectively routing said information signals between said television interphone monitors, said entrance panels and said interface units.

10. The apparatus for connecting a television interphone monitor system to an E concierge station via a communication network according to claim 9, wherein said internal communication lines are connected to a regulated current supply units for supplying regulated current to said television interphone monitors via said internal communication lines for operating said television interphone monitors and for charging a rechargeable batteries associated with said television interphone monitors.

11. An apparatus for connecting a television interphone monitor system to an E concierge station via a communication network selected from the group consisting of dedicated network, public network and the Internet, comprising:

a television interphone monitor connected via internal communication line and a matrix selector with an entrance panel and with an interface unit;

wherein said television interphone monitor and said entrance panel include select keys and are adapted to process information signals including a combination of signals selected from the group consisting of audio signals, video signals, control signals, alarm signals and data signals through said matrix selector and through said internal communication line for communicating selectively between said television interphone monitor with said entrance panel and said interface unit and between said entrance panel and said interface unit;

said interface unit is adapted to process said information signals and communicate interfaced information signals with said E concierge station via said communication network;

wherein one or more of said select keys generate an engage call signal to said interface unit for engaging and connecting said E concierge station through said communication network for communicating said interfaced information signals between one of said television interphone monitor and said entrance panel with said E concierge station through said interface unit; and wherein said matrix selector comprises digital switches for conjointly routing said information signals between said television interphone monitor and said entrance panel with said interface unit.

12. The apparatus for connecting a television interphone monitor system to an E concierge station via a communication network according to claim 11, wherein said internal communication line is connected to a regulated current supply unit for supplying regulated current to said television interphone monitor via said internal communication line for operating said television interphone monitor and for charging a rechargeable battery associated with said television interphone monitor.

13. An apparatus for connecting a television interphone monitor system to an E concierge station via a communication network selected from the group consisting of dedicated network, public network and the Internet, comprising:

a television interphone monitor connected via internal communication line and a matrix selector with a plurality of entrance panels and with an interface unit;

wherein said television interphone monitor and said plurality of entrance panels include select keys and are adapted to process information signals including a combination of signals selected from the group consisting of audio signals, video signals, control signals, alarm signals and data signals through said matrix selector and through said internal communication line for communicating selectively between said television interphone monitor and any one of said plurality of entrance panels and said interface unit and between said any one of said entrance panels and said interface unit;

said interface unit is adapted to process said information signals and communicate interfaced information signals with said E concierge station via said communication network;

wherein one or more of said select keys generate an engage call signal to said interface unit for engaging and connecting said E concierge station through said communication network for communicating said interfaced information signals between one of said television interphone monitor and any one of said entrance panels with said E concierge station through said interface unit; and wherein said matrix selector comprises digital switches for conjointly routing said information signals between said television interphone monitor and one of said entrance panels with said interface unit.

14. The apparatus for connecting a television interphone monitor system to an E concierge station via a communication network according to claim 13, wherein said internal communication line is connected to a regulated current supply unit for supplying regulated current to said television interphone monitor via said internal communication line for operating said television interphone monitor and for charging a rechargeable battery associated with said television interphone monitor.

15. An apparatus for connecting a television interphone monitor system to an E concierge station via a communication network selected from the group consisting of dedicated network, public network and the Internet, comprising:

a plurality of television interphone monitors connected via internal communication lines and a matrix selector with at least one entrance panel and with an interface unit;

wherein said television interphone monitors and said at least one entrance panel include select keys and are adapted to process information signals including a combination of signals selected from the group consisting of audio signals, video signals, control signals, alarm signals and data signals through said matrix selector and through said internal communication lines for communicating selectively between any one of said plurality of television interphone monitors with said at least one entrance panel and said interface unit and between said at least one entrance panel and said interface unit;

said interface unit is adapted to process said information signals and communicate interfaced information signals with said E concierge station via said communication network;

wherein one or more of said select keys generate an engage call signal to said interface unit for engaging and connecting said E concierge station through said communication network for communicating said interfaced information signals between at least one of said television interphone monitor and said entrance panel with said E concierge station through said interface unit; and wherein said matrix selector comprises digital switches for conjointly routing said information signals between at least one of said television interphone monitors and said at least one entrance panel with said interface unit.

16. The apparatus for connecting a television interphone monitor system to an E concierge station via a communication network according to claim 15;

wherein said internal communication lines are connected to a regulated current supply units for supplying regulated current to said plurality of television interphone monitors via said internal communication lines for operating said television interphone monitor and for charging a rechargeable batteries associated with said television interphone monitors.

17. An apparatus for connecting a television interphone monitor system to an E concierge station via a communication network selected from the group consisting of dedicated network, public network and the Internet, comprising:

a plurality of television interphone monitors connected via internal communication lines and a matrix selector with a plurality of entrance panels and with at least one interface unit;

wherein said television interphone monitors and said entrance panels include select keys and are adapted to process information signals including a combination of signals selected from the group consisting of audio signals, video signals, control signals, alarm signals and data signals through said matrix selector and through said internal communication lines for communicating selectively between any one of said plurality of television interphone monitors with any one of said plurality of entrance panels and said at least one interface unit and between at least one of said plurality of entrance panels and said at least one interface unit;

said at least one interface unit is adapted to process said information signals and communicate interfaced information signals with said E concierge station via said communication network;

wherein one or more of said select keys generate an engage call signal to said at least one interface unit for engaging and connecting said E concierge station through said communication network for communicating said interfaced information signals between at least one of said television interphone monitors and at least one of said entrance panels with said E concierge station through said interface unit; and wherein said matrix selector comprises digital switches for conjointly routing said information signals between one or more said television interphone monitors and one or more said entrance panels with said interface unit.

18. The apparatus for connecting a television interphone monitor system to an E concierge station via a communication network according to claim 17, wherein said internal communication lines are connected to a regulated current supply units for supplying regulated current to said television interphone monitors via said internal communication lines for operating said television interphone monitors and for charging a rechargeable batteries associated with said television interphone monitors.

19. An apparatus for connecting a television interphone monitor system to an E concierge station via a communication network selected from the group consisting of dedicated network, public network and the Internet, comprising:

a plurality of television interphone monitors connected via internal communication lines and a matrix selector with a plurality of entrance panels and with a plurality of interface units;

wherein said television interphone monitors and said entrance panels include select keys and are adapted to process information signals including a combination of signals selected from the group consisting of audio signals, video signals, control signals, alarm signals and data signals through said matrix selector and through said internal communication lines for communicating selectively between any one of said plurality of television interphone monitors with any one of said plurality of entrance panels and any one of said plurality of interface units and between any one of said plurality of entrance panels and any one of said plurality of interface units;

said plurality of interface units are adapted to process said information signals and communicate interfaced information signals with said E concierge station via said communication network;

wherein one or more of said select keys generate an engage call signal to any one of said plurality of interface units for engaging and connecting said E concierge station through said communication network for communicating said interfaced information signals between at least one of said television interphone monitors and at least one of said entrance panel with said E concierge station through at least one of said interface units; and wherein said matrix selector comprises digital switches for conjointly routing said information signals between one or more said television interphone monitors and one or more said entrance panels with one or more said interface units.

20. The apparatus for connecting a television interphone monitor system to an E concierge station via a communication network according to claim 19, wherein said internal communication lines are connected to a regulated current supply units for supplying regulated current to said television interphone monitors via said internal communication lines for operating said television interphone monitors and for charging a rechargeable batteries associated with said television interphone monitors.

21. An apparatus for connecting a television interphone monitor system to an E concierge station via a communication network selected from the group consisting of dedicated network, public network and the Internet, comprising:

a television interphone monitor connected via internal communication line and a matrix selector with an entrance panel and with an interface unit;

wherein said television interphone monitor and said entrance panel include select keys and are adapted to process information signals including a combination of signals selected from the group consisting of audio signals, video signals, control signals, alarm signals and data signals through said matrix selector and through said internal communication line for communicating selectively between said television interphone monitor with said entrance panel and said interface unit and between said entrance panel and said interface unit;

said interface unit is adapted to process said information signals and communicate interfaced information signals with said E concierge station via said communication network;

wherein one or more of said select keys generate an engage call signal to said interface unit for engaging and connecting said E concierge station through said communication network for communicating said interfaced information signals between one of said television interphone monitor and said entrance panel with said E concierge station through said interface unit;

wherein said television interphone monitor system further comprises at least one counter station selected from a group consisting of a concierge counter station and a security counter station adapted to communicate said information signals through said matrix selector and said internal communication lines with said interface unit; and wherein said matrix selector comprises digital switches for selectively routing said information signals between said television interphone monitor, said entrance panel, said at least one counter station and said interface unit.

22. An apparatus for connecting a television interphone monitor system to an E concierge station via a communication network according to claim 21, wherein said internal communication line is connected to a regulated current supply unit for supplying regulated current to said television interphone monitor via said internal communication line for operating said television interphone monitor and for charging a rechargeable battery associated with said television interphone monitor.

23. An apparatus for connecting a television interphone monitor system to an E concierge station via a communication network selected from the group consisting of dedicated network, public network and the Internet, comprising:

a television interphone monitor connected via internal communication line and a matrix selector with a plurality of entrance panels and with an interface unit;

wherein said television interphone monitor and said plurality of entrance panels include select keys and are adapted to process information signals including a combination of signals selected from the group consisting of audio signals, video signals, control signals, alarm signals and data signals through said matrix selector and through said internal communication line for communicating selectively between said television interphone monitor and any one of said plurality of entrance panels and said interface unit and between said any one of said entrance panels and said interface unit;

said interface unit is adapted to process said information signals and communicate interfaced information signals with said E concierge station via said communication network;

wherein one or more of said select keys generate an engage call signal to said interface unit for engaging and connecting said E concierge station through said communication network for communicating said interfaced information signals between one of said television interphone monitor and any one of said entrance panels with said E concierge station through said interface unit;

wherein said television interphone monitor system further comprises at least one counter station selected from a group consisting of a concierge counter station and a security counter station adapted to communicate said information signals through said matrix selector and said internal communication lines with said interface unit; and wherein said matrix selector comprises digital switches for selectively routing said information signals between said television interphone monitor, said entrance panels, said at least one counter station and said interface unit.

24. The apparatus for connecting a television interphone monitor system to an E concierge station via a communication network according to claim 23,
wherein said internal communication line is connected to a regulated current supply unit for supplying regulated current to said television interphone monitor via said internal communication line for operating said television interphone monitor and for charging a rechargeable battery associated with said television interphone monitor.

25. An apparatus for connecting a television interphone monitor system to an E concierge station via a communication network selected from the group consisting of dedicated network, public network and the Internet, comprising:
a plurality of television interphone monitors connected via internal communication lines and a matrix selector with at least one entrance panel and with an interface unit;
wherein said television interphone monitors and said at least one entrance panel include select keys and are adapted to process information signals including a combination of signals selected from the group consisting of audio signals, video signals, control signals, alarm signals and data signals through said matrix selector and through said internal communication lines for communicating selectively between any one of said plurality of television interphone monitors with said at least one entrance panel and said interface unit and between said at least one entrance panel and said interface unit;
said interface unit is adapted to process said information signals and communicate interfaced information signals with said E concierge station via said communication network;
wherein one or more of said select keys generate an engage call signal to said interface unit for engaging and connecting said E concierge station through said communication network for communicating said interfaced information signals between at least one of said television interphone monitor and said entrance panel with said E concierge station through said interface unit;
wherein said television interphone monitor system further comprises at least one counter station selected from a group consisting of a concierge counter station and a security counter station adapted to communicate said information signals through said matrix selector and said internal communication lines with said interface unit; and
wherein said matrix selector comprises digital switches for selectively routing said information signals between said television interphone monitors, said at least one entrance panel, said at least one counter station and said interface unit.

26. The apparatus for connecting a television interphone monitor system to an E concierge station via a communication network according to claim 25;
wherein said internal communication lines are connected to a regulated current supply units for supplying regulated current to said plurality of television interphone monitors via said internal communication lines for operating said television interphone monitor and for charging a rechargeable batteries associated with said television interphone monitors.

27. An apparatus for connecting a television interphone monitor system to an E concierge station via a communication network selected from the group consisting of dedicated network, public network and the Internet, comprising:
a plurality of television interphone monitors connected via internal communication lines and a matrix selector with a plurality of entrance panels and with at least one interface unit;
wherein said television interphone monitors and said entrance panels include select keys and are adapted to process information signals including a combination of signals selected from the group consisting of audio signals, video signals, control signals, alarm signals and data signals through said matrix selector and through said internal communication lines for communicating selectively between any one of said plurality of television interphone monitors with any one of said plurality of entrance panels and said at least one interface unit and between at least one of said plurality of entrance panels and said at least one interface unit;
said at least one interface unit is adapted to process said information signals and communicate interfaced information signals with said E concierge station via said communication network;
wherein one or more of said select keys generate an engage call signal to said at least one interface unit for engaging and connecting said E concierge station through said communication network for communicating said interfaced information signals between at least one of said television interphone monitors and at least one of said entrance panels with said E concierge station through said interface unit;
wherein said television interphone monitor system further comprises at least one counter station selected from a group consisting of a concierge counter station and a security counter station adapted to communicate said information signals through said matrix selector and said internal communication lines with said interface unit; and
wherein said matrix selector comprises digital switches for selectively routing said information signals between said television interphone monitors, said entrance panels, said at least one counter station and said interface unit.

28. The apparatus for connecting a television interphone monitor system to an E concierge station via a communication network according to claim 27,
wherein said internal communication lines are connected to a regulated current supply units for supplying regulated current to said television interphone monitors via said internal communication lines for operating said television interphone monitors and for charging a rechargeable batteries associated with said television interphone monitors.

29. An apparatus for connecting a television interphone monitor system to an E concierge station via a communication network selected from the group consisting of dedicated network, public network and the Internet, comprising:
a plurality of television interphone monitors connected via internal communication lines and a matrix selector with a plurality of entrance panels and with a plurality of interface units;
wherein said television interphone monitors and said entrance panels include select keys and are adapted to process information signals including a combination of signals selected from the group consisting of audio signals, video signals, control signals, alarm signals and data signals through said matrix selector and through said internal communication lines for communicating selectively between any one of said plurality of television interphone monitors with any one of said plurality of entrance panels and any one of said plurality of interface units and between any one of said plurality of entrance panels and any one of said plurality of interface units;

said plurality of interface units are adapted to process said information signals and communicate interfaced information signals with said E concierge station via said communication network;

wherein one or more of said select keys generate an engage call signal to any one of said plurality of interface units for engaging and connecting said E concierge station through said communication network for communicating said interfaced information signals between at least one of said television interphone monitors and at least one of said entrance panel with said E concierge station through at least one of said interface units;

wherein said television interphone monitor system further comprises at least one counter station selected from a group consisting of a concierge counter station and a security counter station adapted to communicate said information signals through said matrix selector and said internal communication lines with any one of said plurality of interface unit; and wherein said matrix selector comprises digital switches for selectively routing said information signals between said television interphone monitors, said entrance panels, said at least one counter station and said interface units.

30. The apparatus for connecting a television interphone monitor system to an E concierge station via a communication network according to claim 29, wherein said internal communication lines are connected to a regulated current supply units for supplying regulated current to said television interphone monitors via said internal communication lines for operating said television interphone monitors and for charging a rechargeable batteries associated with said television interphone monitors.

31. An apparatus for connecting a television interphone monitor system to an E concierge station via a communication network selected from the group consisting of dedicated network, public network and the Internet, comprising:

a television interphone monitor connected via internal communication line and a matrix selector with an entrance panel and with an interface unit;

wherein said television interphone monitor and said entrance panel include select keys and are adapted to process information signals including a combination of signals selected from the group consisting of audio signals, video signals, control signals, alarm signals and data signals through said matrix selector and through said internal communication line for communicating selectively between said television interphone monitor with said entrance panel and said interface unit and between said entrance panel and said interface unit;

said interface unit is adapted to process said information signals and communicate interfaced information signals with said E concierge station via said communication network;

wherein one or more of said select keys generate an engage call signal to said interface unit for engaging and connecting said E concierge station through said communication network for communicating said interfaced information signals between one of said television interphone monitor and said entrance panel with said E concierge station through said interface unit;

wherein said television interphone monitor system further comprises at least one counter station selected from a group consisting of a concierge counter station and a security counter station adapted to communicate said information signals through said matrix selector and said internal communication lines with said interface unit; and wherein said matrix selector comprises digital switches for conjointly routing said information signals between a combination selected from said television interphone monitor, said entrance panel, said at least one counter station and said interface unit.

32. An apparatus for connecting a television interphone monitor system to an E concierge station via a communication network according to claim 31, wherein said internal communication line is connected to a regulated current supply unit for supplying regulated current to said television interphone monitor via said internal communication line for operating said television interphone monitor and for charging a rechargeable battery associated with said television interphone monitor.

33. An apparatus for connecting a television interphone monitor system to an E concierge station via a communication network selected from the group consisting of dedicated network, public network and the Internet, comprising:

a television interphone monitor connected via internal communication line and a matrix selector with a plurality of entrance panels and with an interface unit;

wherein said television interphone monitor and said plurality of entrance panels include select keys and are adapted to process information signals including a combination of signals selected from the group consisting of audio signals, video signals, control signals, alarm signals and data signals through said matrix selector and through said internal communication line for communicating selectively between said television interphone monitor and any one of said plurality of entrance panels and said interface unit and between said any one of said entrance panels and said interface unit;

said interface unit is adapted to process said information signals and communicate interfaced information signals with said E concierge station via said communication network;

wherein one or more of said select keys generate an engage call signal to said interface unit for engaging and connecting said E concierge station through said communication network for communicating said interfaced information signals between one of said television interphone monitor and any one of said entrance panels with said E concierge station through said interface unit;

wherein said television interphone monitor system further comprises at least one counter station selected from a group consisting of a concierge counter station and a security counter station adapted to communicate said information signals through said matrix selector and said internal communication lines with said interface unit; and wherein said matrix selector comprises digital switches for conjointly routing said information signals between a combination selected from said television interphone monitor, said entrance panels, said at least one counter station and said interface unit.

34. The apparatus for connecting a television interphone monitor system to an E concierge station via a communication network according to claim 33,
wherein said internal communication line is connected to a regulated current supply unit for supplying regulated current to said television interphone monitor via said internal communication line for operating said television interphone monitor and for charging a rechargeable battery associated with said television interphone monitor.

35. An apparatus for connecting a television interphone monitor system to an E concierge station via a communication network selected from the group consisting of dedicated network, public network and the Internet, comprising:
a plurality of television interphone monitors connected via internal communication lines and a matrix selector with at least one entrance panel and with an interface unit;
wherein said television interphone monitors and said at least one entrance panel include select keys and are adapted to process information signals including a combination of signals selected from the group consisting of audio signals, video signals, control signals, alarm signals and data signals through said matrix selector and through said internal communication lines for communicating selectively between any one of said plurality of television interphone monitors with said at least one entrance panel and said interface unit and between said at least one entrance panel and said interface unit;
said interface unit is adapted to process said information signals and communicate interfaced information signals with said E concierge station via said communication network;
wherein one or more of said select keys generate an engage call signal to said interface unit for engaging and connecting said E concierge station through said communication network for communicating said interfaced information signals between at least one of said television interphone monitor and said entrance panel with said E concierge station through said interface unit;
wherein said television interphone monitor system further comprises at least one counter station selected from a group consisting of a concierge counter station and a security counter station adapted to communicate said information signals through said matrix selector and said internal communication lines with said interface unit; and
wherein said matrix selector comprises digital switches for conjointly routing said information signals between a combination selected from said television interphone monitors, said at least one entrance panel, said at least one counter station and said interface unit.

36. The apparatus for connecting a television interphone monitor system to an E concierge station via a communication network according to claim 35;
wherein said internal communication lines are connected to a regulated current supply units for supplying regulated current to said plurality of television interphone monitors via said internal communication lines for operating said television interphone monitor and for charging a rechargeable batteries associated with said television interphone monitors.

37. An apparatus for connecting a television interphone monitor system to an E concierge station via a communication network selected from the group consisting of dedicated network, public network and the Internet, comprising:
a plurality of television interphone monitors connected via internal communication lines and a matrix selector with a plurality of entrance panels and with at least one interface unit;
wherein said television interphone monitors and said entrance panels include select keys and are adapted to process information signals including a combination of signals selected from the group consisting of audio signals, video signals, control signals, alarm signals and data signals through said matrix selector and through said internal communication lines for communicating selectively between any one of said plurality of television interphone monitors with any one of said plurality of entrance panels and said at least one interface unit and between at least one of said plurality of entrance panels and said at least one interface unit;
said at least one interface unit is adapted to process said information signals and communicate interfaced information signals with said E concierge station via said communication network;
wherein one or more of said select keys generate an engage call signal to said at least one interface unit for engaging and connecting said E concierge station through said communication network for communicating said interfaced information signals between at least one of said television interphone monitors and at least one of said entrance panels with said E concierge station through said interface unit;
wherein said television interphone monitor system further comprises at least one counter station selected from a group consisting of a concierge counter station and a security counter station adapted to communicate said information signals through said matrix selector and said internal communication lines with said interface unit; and
wherein said matrix selector comprises digital switches for conjointly routing said information signals between a combination selected from said television interphone monitors, said entrance panels, said at least one counter station and said interface unit.

38. The apparatus for connecting a television interphone monitor system to an E concierge station via a communication network according to claim 37,
wherein said internal communication lines are connected to a regulated current supply units for supplying regulated current to said television interphone monitors via said internal communication lines for operating said television interphone monitors and for charging a rechargeable batteries associated with said television interphone monitors.

39. An apparatus for connecting a television interphone monitor system to an E concierge station via a communication network selected from the group consisting of dedicated network, public network and the Internet, comprising:
a plurality of television interphone monitors connected via internal communication lines and a matrix selector with a plurality of entrance panels and with a plurality of interface units;
wherein said television interphone monitors and said entrance panels include select keys and are adapted to process information signals including a combination of signals selected from the group consisting of audio signals, video signals, control signals, alarm signals and data signals through said matrix selector and through said internal communication lines for communicating selectively between any one of said plurality of television interphone monitors with any one of said plurality of entrance panels and any one of said plurality of interface units and between any one of said plurality of entrance panels and any one of said plurality of interface units;

said plurality of interface units are adapted to process said information signals and communicate interfaced information signals with said E concierge station via said communication network;

wherein one or more of said select keys generate an engage call signal to any one of said plurality of interface units for engaging and connecting said E concierge station through said communication network for communicating said interfaced information signals between at least one of said television interphone monitors and at least one of said entrance panel with said E concierge station through at least one of said interface units;

wherein said television interphone monitor system further comprises at least one counter station selected from a group consisting of a concierge counter station and a security counter station adapted to communicate said information signals through said matrix selector and said internal communication lines with any one of said plurality of interface unit; and wherein said matrix selector comprises digital switches for conjointly routing said information signals between a combination selected from said television interphone monitors, said entrance panels, said at least one counter station and said interface units.

40. The apparatus for connecting a television interphone monitor system to an E concierge station via a communication network according to claim 39, wherein said internal communication lines are connected to a regulated current supply units for supplying regulated current to said television interphone monitors via said internal communication lines for operating said television interphone monitors and for charging a rechargeable batteries associated with said television interphone monitors.

* * * * *